United States Patent [19]
Loesch et al.

[11] 3,891,120
[45] June 24, 1975

[54] OPERATION MONITOR FOR AIR PRESSURE TYPE SEED PLANTER

[76] Inventors: Leo J. Loesch; Claude E. Loesch, both of Kimball, Minn. 55353

[22] Filed: Mar. 19, 1973

[21] Appl. No.: 342,611

[52] U.S. Cl. .............. 221/2; 221/211; 221/278; 222/40; 73/401; 73/389
[51] Int. Cl. .............................................. G07f 11/00
[58] Field of Search ......... 222/194, 193, 40, 42, 23, 222/71; 221/211, 278, 4, 8; 73/402, 401, 388 BN, 389

[56] References Cited
UNITED STATES PATENTS

| | | | |
|---|---|---|---|
| 1,134,632 | 4/1915 | Nicholson | 73/402 |
| 2,122,897 | 7/1938 | Straw | 222/71 |
| 2,303,121 | 11/1942 | Hartness | 73/402 |
| 3,637,108 | 1/1972 | Loesch et al. | 221/211 |
| 3,731,842 | 5/1973 | Schlegel | 211/278 |

FOREIGN PATENTS OR APPLICATIONS
577,613 9/1924 France .................. 73/402

*Primary Examiner*—Robert B. Reeves
*Assistant Examiner*—H. Grant Skaggs
*Attorney, Agent, or Firm*—H. Dale Palmatier, James R. Haller

[57] ABSTRACT

A monitoring apparatus for a seed dispenser and planter wherein superatmospheric air pressure holds seeds in apertures of the drum periphery until released, and the superatmospheric air sweeps released seeds through discharge tubes for planting; sight glasses and fluid therein sensitive to pressures in the discharge tubes indicating an obstruction and its location in the discharge tube, and additional sight glasses and fluid therein sensitive to air jets emitting from apertures in the drum periphery to indicate presence or absence of seeds, proper rotation of drum, and presence of superatmospheric pressure in the drum, and also indicating proper operation of the monitoring apparatus.

12 Claims, 8 Drawing Figures

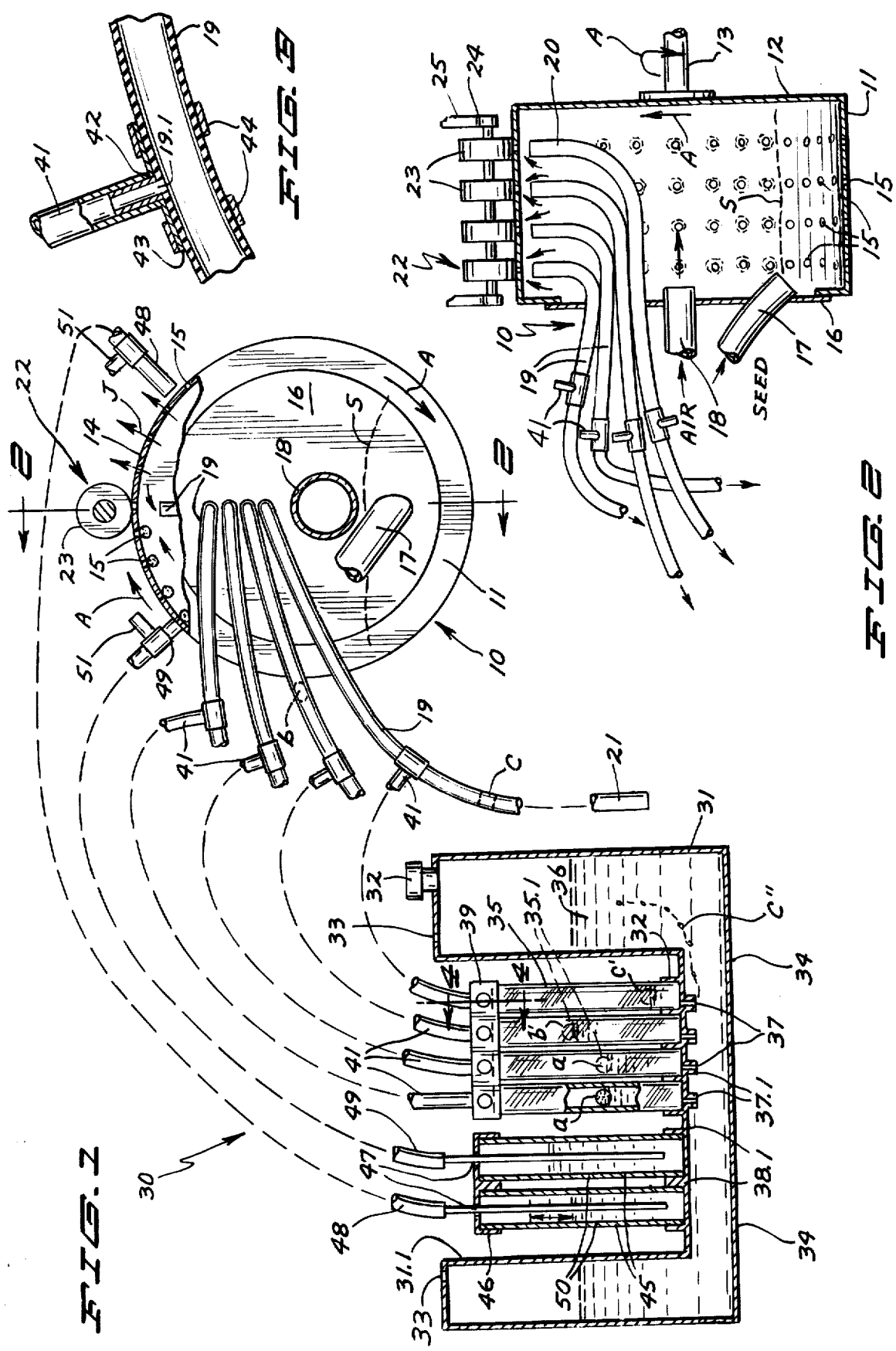

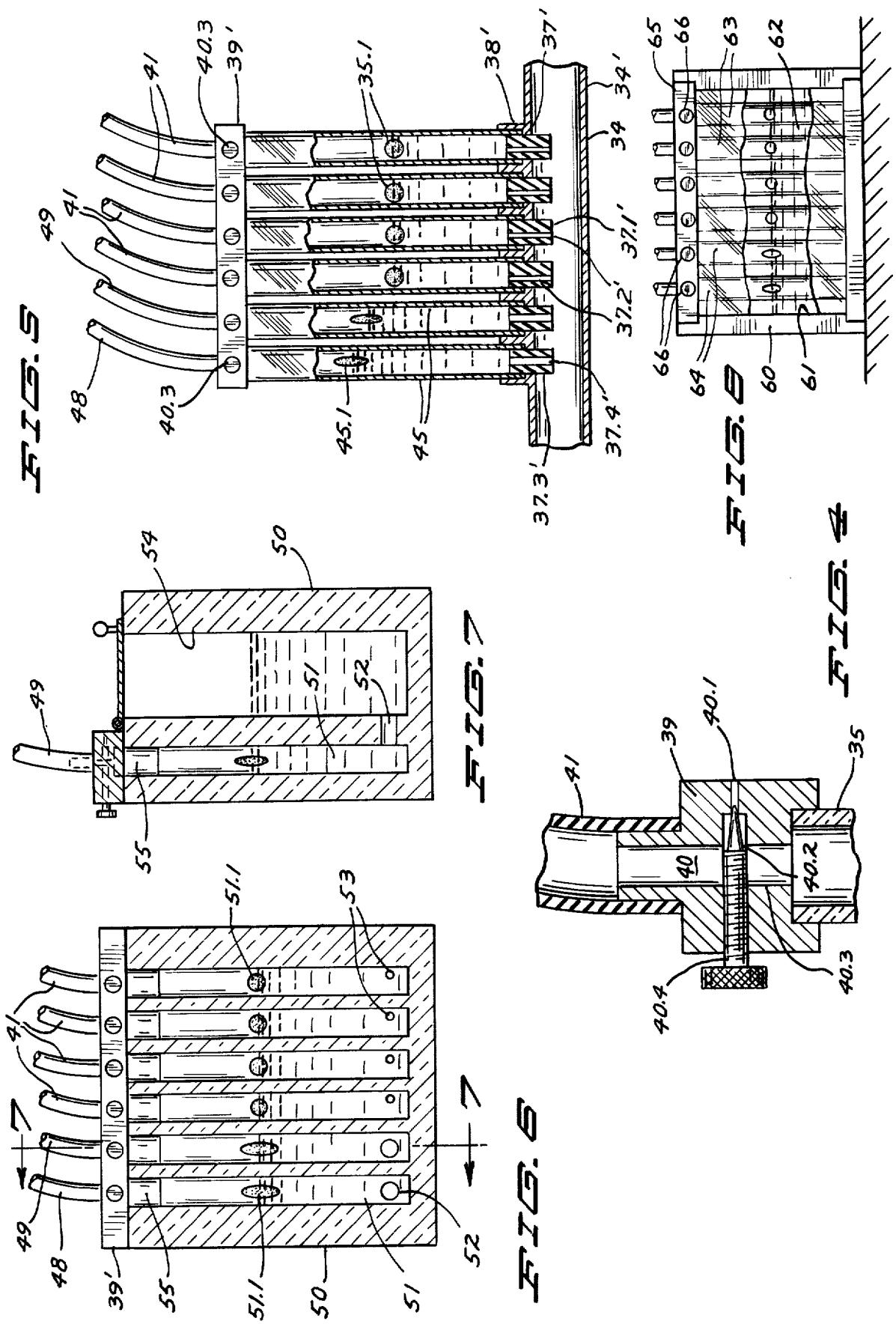

3,891,120

OPERATION MONITOR FOR AIR PRESSURE TYPE SEED PLANTER

BACKGROUND OF THE INVENTION

Applicants have previously invented, and licensed the commercial manufacturing and selling rights with respect to a seed distributor and planter for gently handling seeds and causing seeds to be regularly deposited along the row to be planted as thoroughly described in U.S. Pat. No. 3,637,108. Briefly, the seed is supplied into a revolving drum having a superatmospheric pressure therein. As the drum revolves, individual seeds are carried upwardly on the drum periphery, each seed being held by air pressure at a hold in the drum periphery. At one place in the revolution of the drum, the seeds are released from the drum periphery and are swept by the air in the drum into discharge tubes and are carried by the air to the crop row to be planted.

Although the planter is extremely reliable and handles the seed gently and without damage to the seed, obstructions can conceivably occur in the air and seed carrying discharge tubes and in the tube or conduit supplying seed to the drum. It is also conceivable that interruptions may occur in the power for turning the drum or for supplying pressurized air to the drum.

SUMMARY OF THE INVENTION

The present invention provides a monitoring of the operation of the seed planter and provides indications of the normal and abnormal operations of various aspects of the planter. The invention will sense and locate any obstructions which may occur in the seed discharge tubes; will indicate the presence or lack of seed supply in the drum; and will indicate proper turning of the drum.

More specifically, the present invention is an air pressure sensitive indicator which controls the height of liquid in sight glasses, and by differential air pressures indicates normal or abnormal air conditions at critical locations of the seed planter.

A reservoir of liquid maintains a height of the liquid in a number of sight glasses, each related to one of the discharge tubes. A pressure transfer tube connects the closed top of a sight glass with a discharge tube at a location intermediate the ends of the discharge tube. The normal superatmospheric air pressure in the discharge tube which serves to carry seed, somewhat lowers the liquid level in the sight glass to a normal level. Any obstruction at the seed-receiving end of the discharge tube adjacent the drum will reduce the superatmospheric air pressure in the discharge tube and in the sight glass, and accordingly, the liquid level in the sight glass will go up approximately to the level of the liquid in the reservoir.

If an obstruction occurs at the discharge end of the discharge tube, the air flow in the tube will decrease or stop and the pressure therein will rise to nearly the level of the superatmospheric air pressure in the drum. As a result of higher level air pressure in the top of the sight glass, the liquid level in the sight glass is lowered; and air bubbles may also be seen moving from the sight glass and upwardly through the liquid in the reservoir.

An additional pair of closed sight glasses have liquid therein and have pressure transfer tubes extending into the liquid therein and close to the bottom. The pressure transfer tubes extend to the periphery of the drum and confront the apertures in the drum periphery to receive and sense jets of air emitted from the drum apertures.

Normally the height of liquid in each pressure tube will be the same as the height of liquid in the respective sight glass. When a jet of air is emitted from a revolving drum aperture and directed into the pressure tube, a portion of the liquid in the tube is forced out and thereby raises the level of liquid in the sight glass. As the revolving aperture passes by the stationary tube, pressure in the tube returns to atmospheric pressure, and the height of liquid in the sight glass returns to normal. When a succession of open drum apertures, emitting air jets pass the pressure transfer tube, the level of liquid will repeatedly move down and up and will appear to oscillate or bounce. One of the transfer tubes is located at the side of the drum periphery wherein each of the apertures is normally carrying a seed, and the level of liquid in the sight glass will remain stationary. Of the height of liquid in this sight glass oscillates, the indication is that there is no seed in the drum.

The second of the transfer tubes is located at the side of the drum periphery wherein all of the apertures are open and unobstructed, and the level of liquid in its sight glass will normally oscillate. If the height of liquid in this sight glass remains stationary, the indication is that the drum is failing to revolve as it should.

Where herein the term "sight glasses" is used it is intended to include transparent glass tubes in which the level of liquid may be observed, and it is also intended to include comparable equivalents, such as transparent windows or ports in otherwise opaque tubes or containers, transparent blocks with vertical chambers cored out and the like.

The monitoring apparatus normally monitors the proper operation of the seed planter and particularly the flow of pressurized air carrying seeds through the discharge tubes and the proper rotation of the drum. In producing visual indications of these normal operations of the seed planter the monitoring apparatus also presents visual indications which are significantly different than the observable indications which exist when the monitoring apparatus of itself is not operating properly. Therefore the monitoring apparatus also monitors itself.

BRIEF DESCRIPTION OF THE DRAWINGS

FIG. 1 is a diagrammatic view showing the present invention in section and also illustrating the seed planter to which the present invention is related.

FIG. 2 is a diagrammatic section view taken approximately at 2—2 of FIG. 1 for a more complete understanding of the seed planter.

FIG. 3 is an enlarged detail section view showing the relationship between the seed discharge tube and the pressure transfer tube.

FIG. 4 is an enlarged detail section view taken approximately at 4—4 in FIG. 1.

FIG. 5 is an enlarged detail elevation view of a modified form of monitoring apparatus.

FIG. 6 is a section view taken on an upright plane through a second modified form of the monitoring apparatus.

FIG. 7 is a detail section view taken approximately at 7—7 in FIG. 6.

FIG. 8 is a detailed section view through another modified form of the monitoring apparatus which is partly broken away for clarity of detail.

DETAILED DESCRIPTION OF THE INVENTION

One form of the invention is shown in the drawings and is described herein.

The principal elements of the seed planter are illustrated in FIGS. 1 and 2 and the seed planter is indicated in general by numeral 10. The seed planter includes a revolving cylindrical drum 11 having an end wall 12 which is mounted upon a rotary shaft 13 which drives the rotary drum in the direction of arrows A. The cylindrical peripheral wall 14 of the drum has a plurality of apertures 15 therein and arranged in circumferential rows. A stationary end wall 16 is disposed opposite the rotary end wall 12 and is sealed at its periphery to the revolving drum.

The stationary wall 16 serves the function of mounting the seed supplying chute or conduit 17, the air conduit 18 by which superatmospheric air pressure is supplied and maintained in the interior of drum 11 and a plurality of seed discharge tubes 19, the inner ends 20 of which are disposed within the drum, and the outer ends 21 of which extend to the ground for depositing seed in a furrow dug and then subsequently covered by the machine or equipment upon which the planter 10 is carried. The tubes 19 may be as long as 6 or 8 feet in length and simultaneously receive the individual seeds and superatmospheric air from within the drum which functions to sweep the seeds through the tubes and to the ground for planting.

The seed supply duct 17 is connected to a hopper or other source of stored seeds and will maintain a supply of seeds within the drum 11 at a depth as indicated by the dotted line S in FIG. 2. The seeds will tumble in the drum as it slowly revolves and superatmospheric air pressure within the drum will hold one seed in each of the apertures 15 of the peripheral wall as the wall revolves in an upward direction toward the seed receiving ends 20 of the discharge tubes 19.

At a location immediately above the receiving ends 20 of tubes 19, means, indicated in general by numeral 22, is provided for releasing the seeds held in the apertures by the superatmospheric air so that the seeds will fall from the drum periphery and into the receiving ends 20 of the tubes to be swept away and to the ground by the high pressure air. Such means 22 may take various forms, but in the present disclosure, take the form of soft rubber rollers 23 rolling along the exterior periphery of the revolving drum 11, and the rollers 23 are held in a stationary position on a common mounting shaft 24 carried on mounting brackets 25. The soft rubber rollers 23 serve to obstruct apertures 15 from the outside to seal off air flow through the apertures, thus allowing the seed to drop from the drum periphery into the discharge tube.

As the apertures 15 continue to revolve with the drum periphery past the tubes 19 and rollers 23, the apertures 15 are normally unobstructed so that a continuous jet of air flows outwardly through each of the apertures 15 as the apertures move downwardly again toward the supply S of needs. These jets of air through the unobstructed apertures 15 are indicated by the arrows J in FIG. 1.

Normally the planter 10 is almost completely concealed from the operator of the tractor or equipment used to move the seed planter across the field and it is somewhat difficult to determine whether the planter is properly operating. Although the planter 10 is extremely reliable, it is desirable to be assured of the continued operation of the planter.

Accordingly, the monitoring apparatus indicated in general by numeral 30 is employed to assure the operator of the equipment of the proper operation of the planter.

The monitoring apparatus 30 includes a liquid reservoir 31 which may be shaped as convenient according to the installation and may in certain instances be transparent in nature. The reservoir 31 may have a filler cap 32 and an air vent 33, and it may be desirable to incorporate the vent 33 into the filler cap 32. Of course, suitable screens and dust filters may be employed. The reservoir 31 is connected to and may be formed integrally with a distributor manifold 34 which is connected to a second reservoir 31.1.

Manifold 34 also serves as a base for a number of sight glasses 35. Sight glasses 35 are simply tubular glass tubes or conduits which are transparent so that the liquid contained therein is visible. The liquid 36 contained in the reservoir 31 and sight glasses 35 may be water, or may be some non-freezing liquid such as alcohol or a mixture of ethylene glycol and water to prevent damage to the equipment due to freezing. It is preferable that the liquid 36 be highly flowable and not thick and resistant to flow. The distributor manifold 34 has a plurality of openings 37 of substantially smaller size than the internal diameter of the sight glasses 35, each communicating with the lower end of a respective sight glass 35, and the distributor manifold 34 also has a plurality of mounting sleeves or bosses 38 formed integrally thereof and sealed to the sight glasses. It will be understood therefore that the level of the liquid 36 in the sight glasses 35 will seek the level of the liquid in the reservoir, but because of the small size of the openings 37, flow into and out of sight glasses 35 is restricted so that any rapid movement of liquid in the reservoir, which may be caused by movement of the seed planter over rough terrain, will not cause any sudden change in the level of liquid in sight glasses 35. The sight glasses may contain small bright colored floats to move upwardly and downwardly as the level of liquid changes and thereby make the liquid level in the sight glasses more obvious to quick observation. In order to avoid the floats 35.1 from obstructing the openings 37, the openings 37 are asymmetrically located. Of course, other means may be provided for preventing the floats 35.1 from obstructing the openings 37, but it is important that some means for this purpose be utilized because the openings 37 must remain open so that air can be forced outwardly therethrough and outwardly into the reservoir.

Each of the openings 37 in the top of distributor manifold 34 is surrounded by a depending boss 37.1 which serves the purpose of preventing air escaping downwardly through one opening 37 from going into another of the openings 37.

A fitting 39 fits over the upper ends of sight glasses 35 and has a plurality of apertures 40 therein, each of which is connected to and mounted on the fitting 39 by bosses or nipples surrounding each of the apertures 40. The fitting 39 is constructed so that the upper end of each of the sight glasses 35 is connected in sealing relation to the respective pressure transfer tube 41. The fitting 39 incorporates a plurality of air bleeder ports 40.1, each communicating with a respective air pressure transmitting aperture 40, and each of the ports 40.1 also communicates with the atmosphere for the purpose of bleeding off a portion of the air pressure in the aperture 40. Each of the apertures 40.1 has a needle valve 40.2 extending thereinto for obstructing and partially closing the port 40.1 when the needle valve is screwed by turning the knurled nob 40.3 and the threaded shank 40.4 in threads formed in the fitting 39.

Each of the pressure transfer tubes 41 extends to an is connected to a respective seed discharge tube 19 at a location on the discharge tube 19 intermediate the seed receiving end 20 and the discharge end 21 thereof. The connection between the seed discharge tube 19 and the pressure transfer tube 41 must be equipped in such a way as to avoid the creation of any obstruction within the tube 19 as would tend to prevent free movement of seeds through the tube 19. As illustrated in FIG. 3 the pressure transfer tube 41 may be connected by a boss or nipple 42 affixed to an apertured plate 43 and mounted on the seed discharge tube 19 by straps or hose clamps 44. The pressure discharge tube has an aperture 19.1 in open communication with the nipple 42 and pressure transfer tube 41.

During normal operation of the planter 10, the superatmospheric air within the drum 11 is continuously sweeping into the receiving ends 20 of the discharge tubes 19, and carrying seeds therein as the seeds are released from the drum. The air pressure in the discharge tube 19 is greater than atmospheric and this air pressure is transferred through the tubes 41 into the upper ends of the sight glasses. The somewhat increased pressure in the sight glasses forces the liquid level in the sight glasses downwardly as indicated by the letter $a$ in FIG. 1. This level $a$ is below the level of the liquid in the reservoir. It is desirable that the normal levels of the liquid in all of the sight glasses 35 should be approximately the same. In order to adjust the level of the liquid in each of the sight glasses, the needle valve 40.2 which controls the quantity of air bled off at the valve is adjusted so as to adjust the pressure of the air at the top of the sight glass. It will be understood that certain of the seed discharge tubes 19 are quite long while other of the seed discharge tubes are somewhat shorter. Therefore the pressure at the point wherein the tubes 41 are tapped into the seed discharge tubes 19 will vary somewhat from one tube to another. By adjusting the needle valve 40.2 of each of the sight glasses 35, the level of the liquids in the sight glasses may be adjusted to be equal.

In the event of an obstruction in the discharge tube 19 at a location adjacent the drum 11 or adjacent the seed receiving end 20 of the tube, and such an obstruction is illustrated in FIG. 1 and indicated by the letter $b$, the result of course is that the flow of air through the discharge tube is either materially reduced or cut off so that no further seeds are being planted from that discharge tube. The obstruction $b$ prevents superatmospheric air pressure from reaching the corresponding pressure transfer tube 41 and the liquid level in the corresponding sight glass will equalize with the level of liquid in the reservoir as indicated by the letter $b$ in FIG. 1. It will therefore be observed that when the level of liquid in any of the sight glasses moves from the level $a$ to the level $b'$, the operator may conclude, with reasonable certainty, that the obstruction in the seed discharge tube 19 is near the receiving end 20 thereof.

In the event of an obstruction in one of the seed discharge tubes 19 at a location near the discharge end 21 thereof, as indicated by the letter $c$ in FIG. 1, the effect is the prevention of air flow through the seed discharge tube so that no more seeds are being swept through for planting. However, because the obstruction $c$ is near the discharge end, the pressure in substantially the entire tube 19 will approximate the same superatmospheric air pressure as is found in the drum 11, whereupon this superatmospheric air pressure is transferred to the corresponding sight glass to cause the level of liquid to go down in the sight glass to the level indicated by the letter $c$ in FIG. 1. When the operator observes the liquid level in one of the sight glasses to be at $c$, he will conclude that the corresponding seed discharge tube is obstructed near the discharge end thereof.

Subsequently, when the obstructions are cleared in the discharge tubes 19, the liquid levels in all of the sight glasses should be approximately the same and should be approximately that as indicated in letter $a$ in FIG. 1. It will be understood that the location along discharge tube 19 wherein the pressure transfer tube 41 is connected, the air pressure is neither atmospheric which is found at the extreme discharge end 21 of the tube, nor the same superatmospheric pressure found at the receiving end 20 of the tube, but the pressure in the ube 19 at the connection to tube 41 will be part way between the maximum and minimum air pressures at the opposite ends of the discharge tube. Accordingly, the level $a$ in the sight glasses is somewhat lower than the level $b'$ and somewhat higher than level $c'$.

It should also be pointed out that in such instances wherein an obstruction $c$ occurs near the discharge end of the seed discharge tube 19, the liquid level in the corresponding sight glass may go entirely to the bottom of the sight glass so that air is forced downwardly through the corresponding hole 37, causing air bubbles $c''$ to rise through the reservoir.

Two additional sight glasses 45 are carried in fittings 38.1 on the distributor manifold 34 and are sealed in the fittings 38.1. Fittings 46 are applied to the top of sight glasses 45 and provide vent 47 to expose the interior of sight glass 45 to the atmosphere. pressure transfer tubes 48 and 49 are formed of flexible hose material at the exterior of the sight glasses, and formed of rigid material that may be transparent at 48.1, 49.1 within sight glasses 45. The pressure transfer tubes 48 and 49 extend downwardly into sight glasses 45 and close to the bottom thereof. The pressure transfer tubes 48 and 49 are immersed in the liquid 50.1 within the sight glasses 45, and, as previously described, the liquid 50.1 may be of a number of suitabie materials but preferably should be a non-freezing material.

Pressure transfer tubes 48 and 49 extend into confronting relation with the exterior periphery of the drum 11 so as to confront a row of apertures 15 in the cylindrical wall 14. The rigid transparent tubes 48.1, 49.1 may be also considered sight glasses and the tubes 45 may be considered the reservoirs therefor. The ends of tubes 48 and 49 may be carried on suitable adjustable brackets 51.1 in stationary position whereby when aperture 15 passes beneath the open end of either of the pressure transfer tubes 48 or 49, the liquid level in the sight glasses 45 will be caused to change. The tubes may be adjusted in brackets 51.1 to various spacings from the drum.

Ordinarily, the apertures 15 are obstructed by seeds as they pass beneath the end of pressure transfer tube 49 so that in the normal operation of the seed planter 10 the level of liquid in the corresponding sight glass 45 will remain stationary. In the event that the supply of seeds S in the drum 11 has become depleted so that no seeds are in the apertures 15 as the apertures pass by the open end of transfer tube 49, jets of air will successively be directed into the end of pressure transfer tube 49 as the drum revolves. These jets of air will increase the air pressure within the tube 49, forcing the small quantity of liquid 50 which is contained in the end of tube 49 to be expelled and this causes the level of liquid in the corresponding sight glass 45 to be elevated. Because the jet of air is directed into the tube 49 only momentarily, the liquid level in the sight glass to which tube 49 is connected will tend to oscillate or bounce, thus attracting the attention of the operator who will immediately conclude that the seed supply has been depleted.

The open end of the pressure transfer tube 48 is disposed along the side of the drum periphery wherein the apertures 15 are normally unobstructed and normally have the jets J of air emitting therefrom. As these jets J of air pass by the open end of pressure transfer tube 48, the level of liquid in the corresponding sight glass 45 is caused to oscillate or bounce, and this oscillation is the normal appearance of the liquid level in this corresponding sight glass.

In the event that there is an interruption to the power for rotating the drum 11 so that the drum does not revolve properly, the jets J of air from the apertures 19 will either stop being emitted into the end of tube 48 because the drum is stationary, or the jet may be continuously directed into the end of tube 48. In either event the level of the liquid 50 in the corresponding sight glass 45 will remain stationary and this will indicate to the operator of the machine that the drum is not being revolved properly. Of course, if the drum is revolving slower than normal, the oscillation in the corresponding sight glass 45 will be slower than the normal and this will be immediately observed by the operator.

The monitoring apparatus 30 will also tell the operator if the source of air pressure has been interrupted in which event there would be no seeds being supplied through the tubes 19. The lack of air pressure in the drum 11 is indicated by the combined indications whereby the level of liquid in all of the sight glasses 45 will be the same and will be at the level $b'$ as indicated in FIG. 1; and by the further indication that the sight glass 45 corresponding to that receiving the air jets from the tube 48 will have a constant liquid level as compared to its normal bouncing condition.

The monitoring apparatus 30 will also produce indications that it, the monitoring apparatus 30, is operating properly. During the time when the monitoring apparatus is supposed to be operating, the liquid level in each of the sight glasses 35 will be at the level $a$ and the liquid level in the sight glass 50 connected to transfer tube 48 will be oscillating. All of these conditions are different than the conditions that exist when the monitoring apparatus is not operating properly. For instance, if any one of the pressure transfer tubes 41 were torn so as to allow air pressure to escape which would otherwise be transferred into the corresponding sight glass 35, the level of liquid in the corresponding sight glass would rise to the level $b'$, seeking the level of the liquid in the reservoir; and the operator of the machine will immediately know something has faulty operation, either the monitor or the seed discharge tube may be obstructed near its lower end as previously described, but in any event the operator will be apprised of the fact that something is not operating correctly.

Likewise, if the pressure transfer tube 48 were to be torn or pinched so as to allow air pressure to escape or otherwise prevent proper transfer of air pressure into the corresponding sight glass 50, the liquid in the sight glass will stop bouncing so that the operator will conclude that something is not operating properly, and the faulty operation may be in the monitoring apparatus 30 itself, but in any event, if the monitoring apparatus at the pressure transfer tube 48 is damaged or pinched, there will be an indication of it and the operator can take steps to correct this situation.

In the form illustrated in FIG. 5, the manifold 34' has enlarged openings 37' to receive stoppers 37.1' which are frictionally held in the lower ends of the sight glasses 35 and which have the small openings 37.2' therein through which the liquid flows into and out of the sight glasses from the reservoir.

The sight glasses 45 are connected to pressure transfer tubes 48 and 49 through the fitting 39' and through bleeder valves for all of the air ports which provide for bleeder valves for all of the air pressure transfer tubes 41, 48, 49. In this form, the sight tubes 45 are sealed to the air pressure transfer tubes 48, 49 through the valve structure in sealed relation so that air pressure in the tubes 48, 49 is applied directly to the liquid in the sight glasses 45. The plugs 37.3' which provide the communication between the lower ends of sight glasses 45 and the distributor manifold 34' of the reservoir have enlarged openings 37.4' which are substantially non-restrictive to flow of liquid therethrough. Therefore, when pulses of increased air pressure are supplied to the top ends of the sight glasses 45, the level of liquid in the sight glasses 45 will change rapidly and, as previously described, during normal operation of the seed planter, pulses of air pressure will normally be supplied at a regular rate through the tube 49 so that the liquid in the corresponding sight glass is continuously bouncing or oscillating upwardly and downwardly. Floats 45.1 may be confined within the sight glasses 45 to float on the liquid confined therein to make the observation of the liquid level somewhat easier.

As previously indicated in connection with the form of the invention illustrated in FIGS. 1 - 4, the monitoring apparatus also monitors itself and produces a visual indication when the monitoring apparatus is not operating properly.

In the form of the invention illustrated in FIGS. 6 and 7, the sight glasses and reservoir are combined in a single integral unit. A block of molded plastic material 50 of any suitable clear transparent plastic such as a polycarbonate is molded with a plurality of cavities 51 extending from the top to substantially the bottom of the block. The cavities 51 are connected by outlet ports 52, 53 to the reservoir chamber 54 which is located all along the back side and opposite all of the cavities 51. It will be noted that the ports or openings 52 are non-restrictive to flow of liquid between the cavities 51 and the reservoir 54, but the smaller ports or openings 53 are restrictive to flow so that any oscillation or bouncing of liquid in the reservoir will not be readily transmitted to the corresponding cavities in the plastic block.

The upper end of each of the cavities 51 has a connecting nipple 55 sealed therein and extending upwardly into the fitting 39' which incorporates the bleeder valves as illustrated in FIG. 4. Through the fitting 39' and the openings therein, the upper ends of each of the cavities 51 is connected to a respective air pressure transfer tube 41, 48, or 49.

As previously indicated, the normal operation of the seed planter will cause air pressure to be transferred through pressure transfer tubes 41 to the respective cavities 51 to reduce the level of liquid therein and the liquid will flow therefrom into the reservoir 54. If obstructions in the seed discharge tubes occur, the level of liquid in the cavities will change as a result of changes in pressure transferred by the tubes 41.

As the drum revolves in a normal way, the pressure from the transfer tube 48 is transmitted into the respective cavity 51 and the level of liquid therein will normally oscillate or bounce so as to produce a regular upward and downward movement of the float 51.1 contained therein. Of course, each of the other cavities may also have a float 51.1 of a suitable shape therein to rapidly indicate the level of liquid in the cavity.

In the same fashion as previously described, the monitoring apparatus will monitor itself as well as the proper operation of the seed planter.

In the form of the invention illustrated in FIG. 8, the framework 60 defines a reservoir 61 containing a quantity of liquid 62. The sight glasses 63 and 64 correspond to the sight glasses 35 and 50, respectively, in FIG. 1 and are similarly related to the seed planter and the pressure transfer tubes. The top fitting 65 of the framework incorporates bleed valves 66 similar to those illustrated in FIG. 4. In this form of the invention, the sight glasses 63 and 64 merely rest upon the bottom of the framework which defines the bottom of reservoir 61. The sight glasses 63 have restricted communication with the liquid 62 in the reservoir beneath the lower ends of the sight glasses 63 where the sight glasses abut upon and are supported by the bottom of the reservoir. In order to increase the flow capacity into and out of the sight glass 64, to permit the necessary oscillation to indicate the proper rotation of the drum, by application of the air pressure from air pressure transfer tube 48, notches may be cut in the bottom edge of the sight glass 64 so that the liquid 62 from the reservoir may flow into and out of the sight glass 64 without restriction.

Although the form of the invention with the liquid in the sight glasses is preferred, air pressure sensing and indicating means using sight glasses may direct the air pressure being sensed into the lower end of the sight glass to raise or essentially float a weighted object, such as a steel ball, as a bearing or a closure in a check valve, upwardly under response of the air pressure. This form of indicator may also be used as a monitor for monitoring air pressure and for monitoring its own operation because the weighted object or ball would normally be at the lower end of the sight glass and raised only upon proper operation of the monitor due to proper operation of the seed planter wherein the weighted object or ball would be located in the sight glass upwardly from the bottom and would essentially float on air pressure supporting it and passing by to escape.

It will be seen that we have provided a new and improved monitoring apparatus to indicate the proper or improper operation of a seed planter so as to indicate when the seed discharge tubes are carrying air properly to sweep seeds to the ground, to indicate whether the proper supply of seeds is available within the drum; to indicate whether the drum is properly revolving; and to indicate whether a proper air supply is available within the drum for its proper operation.

What we claim is:

1. In combination with a seed dispenser including a revolving drum containing superatmospheric air and a supply of seeds and the receiving ends of stationary discharge tubes located out of the seed supply and in confronting relation to peripheral apertures in which the seeds are carried until released at the discharge tubes through which the superatmospheric air sweeps the seeds for discharge from the drum, a combined, continuously acting air flow obstruction detector and indicator for such discharge tubes comprising a reservoir of liquid, a sight glass with its lower end in liquid flow communication with the reservoir of liquid to equalize the liquid level in the glass and reservoir, the sight glass having a closed top, and a pressure transfer tube communicating with the sight glass through the closed top thereof, and the transfer tube also being connected to one of the seed discharge tubes in air pressure communicating relation to apply the air pressure from the discharge tube with the sight glass for application against the liquid therein and produce a liquid level which will subsequently change in response to pressure changes in the discharge tube caused by obstructed air flow therethrough.

2. The invention set forth in claim 1 and the pressure transfer tube being connected to the seed discharge tube at a location intermediate the ends of the seed discharge tube whereby to increase the air pressure in the transfer tube and in the sight glass to the superatmospheric pressure in the drum and reduce the height of the liquid in the sight glass in response to an obstruction in the discharge end of the discharge tube, and whereby to decrease the air pressure in the transfer tube and sight glass to nearly atmospheric pressure and to thereby increase the height of liquid in the sight glass in response to an obstruction in the discharge tube adjacent the drum.

3. The invention set forth in claim 1 and the reservoir having a vent to maintain atmospheric air pressure therein.

4. The invention set forth in claim 1 including a plurality of sight glasses, and a plurality of pressure transfer tubes each connecting one of the sight glasses with a respective seed discharge tube.

5. In combination with a seed dispenser including a revolving drum with apertures through the periphery thereof, the drum containing superatmospheric air and a supply of seeds, the air holding a seed in each of the revolving drum apertures, and seed release and discharge means at a location above the seed supply in the drum whereby at opposite peripheral portions of the drum the apertures are normally respectively closed by seeds and open, an air flow detector and indicator to indicate flow of air through the peripheral drum apertures comprising a sight glass containing a quantity of liquid, and a pressure transfer tube having one end connected to the sight glass, the pressure transfer tube also extending to the drum with the second end of the tube confronting the periphery of the drum and an aperture thereof whereby to receive a jet of air from an open aperture of the revolving drum and produce a change in the level of liquid in the sight glass.

6. The invention set forth in claim 5 and the second end of the transfer tube being located adjacent the side of the drum periphery wherein the apertures are normally closed by seeds carried therein, whereby change of liquid level in the sight glass will normally indicate depletion of the seed supply within the drum.

7. The invention set forth in claim 5 and the second end of the transfer tube being located adjacent the side of the drum periphery wherein the apertures are normally open, whereby the liquid level in the sight glass will normally oscillate and a stationary liquid level will normally indicate the drum to be stationary.

8. The invention set forth in claim 6 and a second glass and a second transfer tube, both constructed and arranged with respect to each other and with respect to the drum as set forth in claim 5, and the second end of the second transfer tube being located adjacent the side of the drum periphery wherein the apertures are normally open, whereby the liquid level in the second sight glass will normally oscillate and a stationary liquid level will normally indicate the drum to be stationary.

9. In combination with a seed dispenser including a revolving drum with apertures through the periphery thereof, the drum containing superatmospheric air and a supply of seeds and the receiving ends of stationary discharge tubes located out of the seed supply and in confronting relation with the peripheral apertures in which the seeds are carried, seed release means operative adjacent the receiving ends of the discharge tubes to cause the superatmospheric air to sweep seeds into the discharge tubes, the drum apertures being normally open after seeds have been released therefrom and swept out of the discharge tubes, an air flow and obstruction detecting and indicating means for such discharge tubes and the revolving drum and comprising a reservoir of liquid, a plurality of obstruction indicating sight glasses each having its lower end in liquid flow communication with the reservoir of liquid to equalize the liquid level in the glasses and reservoir, the sight glasses having closed tops, a plurality of obstruction pressure communicating tubes each being connected with a respective sight glass through the closed top thereof and also being connected to one of the seed discharge tubes at a location intermediate the seed-receiving and discharge ends thereof for communicating the air pressure within the seed discharge tubes to the sight glass for applying the air pressure to the liquid therein and changing the level of the liquid in the sight glass accordingly, a pair of drum air escape indicating sight glasses having closed bottoms and vented tops and containing a visible level of liquid therein, and a pair of pressure transfer tubes each having one end extending into a respective sight glass and into the liquid therein and adjacent the bottom thereof, and each of said transfer tubes also extending to the drum with the second end of the tube confronting the periphery of the drum and an aperture thereof whereby to receive a jet of air from the aperture when open, and produce a change in the level of liquid in the corresponding sight glass, the second air jet receiving ends of said pressure transfer tubes being respectively located adjacent the opposite sides of the drum periphery wherein the apertures are respectively normally open and closed whereby one of the pressure transfer tubes will regularly receive jets of pressurized air from the drum apertures as the drum is revolved and the other of the pressure transfer tubes will normally be prevented from receiving jets of air from the apertures by seeds obstructing the apertures, said obstruction detecting and indicating sight glasses indicating the presence or absence and location of obstructions in the seed discharge tubes and the drum air escape indicating sight glasses indicating the rate of rotation of the drum and the presence or absence of a supply of seeds within the drum and all of said sight glasses cooperating to indicate continued presence of air pressure within the drum for proper operation.

10. In combination with a seed dispenser including a revolving drum containing superatmospheric air and a supply of seeds and the receiving ends of stationary discharge tubes located out of the seed supply and in confronting relation to peripheral apertures in which the seeds are carried until released at the discharge tubes through which the superatmospheric air sweeps the seeds for discharge from the drum.

a combined, continuously acting operation monitoring and detecting apparatus comprising a reservoir of liquid, a sight glass containing a quantity of the liquid capable of rising and lowering in response to various air pressures applied thereagainst, and a pressure transfer tube with one end connected to the sight glass and having a second end at the seed dispenser and exposed to such superatmospheric air pressure, the tube applying air pressure against the liquid in the sight glass and producing a change in the level of liquid therein according to the magnitude of the air pressure.

11. In combination with a seed dispenser including a revolving drum containing superatmospheric air and a supply of seeds and the receiving ends of stationary discharge tubes located out of the seed supply and in confronting relation to peripheral apertures in which the seeds are carried until released at the discharge tubes through which the superatmospheric air sweeps the seeds for discharge from the drum, the superatmospheric air escaping through such apertures after removal of seeds therefrom;

a combined, continuously acting air pressure detector and indicator for such seed dispenser comprising a reservoir of liquid, said detector and indicator including a plurality of air pressure transfer tubes having air pressure receiving ends at the seed dispenser and in sensing relation with superatmospheric air at a plurality of locations; and sight glasses connected to the delivery ends of such transfer tubes and containing liquid with variable surface elevations varying according to the air pressures delivered from the transfer tubes.

12. In combination with a seed dispenser including a revolving drum containing superatmospheric air and a supply of seeds and the receiving ends of stationary discharge tubes located out of the seed supply and in confronting relation to peripheral apertures in which the seeds are carried until released at the discharge tubes through which the superatmospheric air sweeps the seeds for discharge from the drum, the superatmospheric air escaping through such apertures after removal of seeds therefrom;

a continuously acting air pressure detector and indicator for such seed dispenser comprising a reservoir of liquid, said detector and indicator including a plurality of air pressure transfer tubes having air pressure delivery ends and also having air pressure receiving end at the seed dispenser and in sensing relation with superatmospheric air at a plurality of locations; and sight glasses connected to the delivery ends of such transfer tubes subject to the air pressures delivered from the transfer tubes and movable in the sight glasses to produce position indications according to the air pressures delivered, said sight glasses and reservoir being integrally combined in a transparent block of clear plastic having a reservoir cavity and a plurality of upright sight glass cavities, each of the latter connected at its top to the delivery end of a respective transfer tube and each communicating with the reservoir cavity.

* * * * *